(12) United States Patent
Tognazzini

(10) Patent No.: US 6,295,482 B1
(45) Date of Patent: Sep. 25, 2001

(54) ELECTRONIC NEWSPAPER VENDING MACHINE

(75) Inventor: Bruce Tognazzini, Woodside, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 614 days.

(21) Appl. No.: 08/670,932

(22) Filed: Jun. 26, 1996

(51) Int. Cl.[7] .................................................. G06F 17/00
(52) U.S. Cl. ........................ 700/233; 700/231; 700/235; 700/237; 700/238
(58) Field of Search .................................. 221/154, 129, 221/131, 195; 700/231, 232, 233, 234, 235, 236, 237, 238

(56) References Cited

U.S. PATENT DOCUMENTS

| | | | |
|---|---|---|---|
| 4,967,366 | * | 10/1990 | Kaehler .................................. 364/479 |
| 5,091,713 | * | 2/1992 | Horne et al. .......................... 340/541 |
| 5,097,981 | * | 3/1992 | Degasperi et al. ........................ 221/3 |
| 5,132,915 | * | 7/1992 | Goodman .............................. 364/479 |
| 5,220,275 | * | 6/1993 | Holmqvist ......................... 324/76.82 |
| 5,243,174 | * | 9/1993 | Veeneman et al. ................... 235/381 |
| 5,303,214 | * | 4/1994 | Kulakowski et al. ................. 369/34 |
| 5,337,253 | * | 8/1994 | Berkovsky et al. ................. 364/479 |
| 5,415,264 | * | 5/1995 | Menoud ................................ 194/217 |
| 5,438,523 | * | 8/1995 | Humm et al. ......................... 364/479 |
| 5,546,316 | * | 8/1996 | Buckkey et al. ................ 364/479.03 |
| 5,611,456 | * | 3/1997 | Kasper ................................. 221/154 |

OTHER PUBLICATIONS

Online Jul./Aug., 1995, Greg R. Notess, Searching the World–Wide Web: Lycus, WebCrawler and More, pp. 48–53.*

Financial Times London Edition, p15, Mar. 17, 1997, Media Futures.*

Newsbytes, Jun. 25, 1996, FCC Approves Digital Data Transmission By Broadcasters, Bill Pietrucha.*

French Connexions, A Range of on–line services to 200 homes via cable modems, 11/96.*

* cited by examiner

Primary Examiner—William Grant
Assistant Examiner—Ramesh Patel
(74) Attorney, Agent, or Firm—McDermott, Will & Emery

(57) ABSTRACT

A newspaper vending machine is equipped with a computerized control and an infrared (IR) communications transceiver. A user equipped with an IR transceiver may download an electronic copy of an article, an electronic copy of the newspaper itself or a network address where these may be obtained. The IR link is also used to transfer digital cash or payment authorizations to the vending machine in exchange for the information.

21 Claims, 16 Drawing Sheets

| MENU |
|---|
| 1. PURCHASE ELECTRONIC ARTICLE FROM VENDING MACHINE<br><br>2. PURCHASE ENTIRE ELECTRONIC NEWSPAPER FROM VENDING MACHINE<br><br>3. PURCHASE PHYSICAL COPY OF NEWSPAPER<br><br>4. SUBSCRIBER ACCESS<br><br>5. EXIT |

FIG. 11

ELECTRONIC NEWSPAPER VENDING MACHINE

BACKGROUND OF THE INVENTION

1. Field of the Invention

The invention relates to the field of vending machines and more particularly to a newspaper vending machine capable of dispensing either an electronic version of a newspaper, or portion thereof, or of dispensing a physical product.

2. Description of Related Art

Newspaper vending machines are ubiquitous. They are found on city streets, in subway stations, in building lobbies and a wide variety of other locations. The purpose of the vending machine is twofold: it is both an advertising device and a repository for copies of the advertised item for sale. As an advertising device, the vending machine relies upon the headlines of the newspaper to generate enough interest for an individual to deposit sufficient money to pay for and retrieve the entire newspaper. As a repository for the newspaper itself, the vending machine is severely limited in the number of newspapers it can hold.

Many people find that newspapers are bulky, inconvenient to read, and have ink that smears onto their hands. They also contain vast amounts of information that the purchaser does not want. These are all disincentives for people to buy a newspaper.

Newspaper owners are aware of these disincentives and have developed alternative methods of delivering a newspaper's information content. Some newspapers are available electronically via the World Wide Web (WWW) on the Internet for free or by subscription. Others are available through the various on-line services or content providers, either as part of basic connect-time charges or as optional surcharged items. Still others use their own proprietary networks employing either a flat or a time-sensitive rate structure.

However, for a potential purchaser of an electronic form of the newspaper, the knowledge that he will have to navigate through various electronic media to locate a news item that piqued his interest provides a strong disincentive to accessing a newspaper electronically. It would often save time just to purchase the printed copy from the vending machine, even with its attendant deficiencies, rather than painfully search disparate electronic networks for the desired item.

Short range infrared (IR) transmitters and receivers are well known in the art, most commonly in conjunction with hand held remote control devices such as those used for television channel selection or for control of a Video Cassette Recorder (VCR).

Small hand held computing devices such as personal digital assistants or hand held computers are also known in the art.

Small hand held cellular telephones are commercially available in a variety of forms.

SUMMARY OF THE INVENTION

The invention provides and apparatus, system, methods and computer program products which permits a user to query, for example, an electronic newspaper vending machine to acquire (1) the text of an article, (2) an electronic version of an entire newspaper or (3) the information necessary to locate the electronic version automatically. Electronic cash systems or payment authorizations are used to pay any associated fees. The invention integrates a computer having an infra-red transmitter/receiver (IRTR) with a vending machine which communicates with a similar IRTR device located within the user's portable computing device. The user's computing device also contains a cellular modem to allow connection to the various networks upon which electronic newspapers may reside. In a similar way, IRTRs may be integrated with billboards, or any advertising devices.

An electronic vending machine embodiment will be used throughout to illustrate the invention. When a user's attention is captured by a headline on a newspaper contained within the electronic vending machine, he aims his portable computing device at the vending machine and presses a key to notify the vending machine that he would like the information to be transmitted to his computer. The vending machine's IRTR responds with a data stream which contains either the requested information or information to locate the electronic version of the newspaper on the appropriate network together with any cost information useful to the user. If the user decides to access a networked electronic version, the address received from the vending machine is passed to commercial software such as a web browser which will automatically create the necessary data link to the appropriate network using a cellular modem and log the user onto the network.

In situations where on-line browsing is not available or desired, anonymous File Transfer Protocol (FTP) or any of a wide variety of techniques may be employed to download the newspaper to the user's computer for local viewing. Finally, some retailers of electronic information may choose to allow a direct download of the entire document from the vending machine's IRTR computing device to the user's electronic reader.

The invention relates to apparatus for dispensing electronic versions of part of all of a newspaper, including: a vending machine for dispensing copies of a printed newspaper, a transceiver, and a computer, connected to the vending machine and the transceiver, configured to respond to a query from a user received over the transceiver, for providing information related to the newspaper over the transceiver to the user. The transceiver is an infrared transceiver. The vending machine is configured to dispense a copy of a printed newspaper when payment is received over the transceiver. Alternately, the vending machine can dispense an article, a network address or a digital copy of the newspaper.

The invention is also related to apparatus for receiving information relating to a newspaper from a vending machine equipped with a transceiver, including a transceiver, and a computer, connected to the transceiver, configured to send a query to the vending machine over the transceiver, and configured to receive information related to the newspaper over the transceiver from the vending machine. The apparatus includes the functionality of a personal digital assistant.

The invention is also related to a method of retrieving information from a vending machine equipped with a transceiver, including the steps of providing an element for performing the step of sending a query to the vending machine, and providing an element for performing the step of receiving the information from the vending machine. The query may include a password or subscription information and a password valid for one or more editions of the newspaper. The information received from the vending machine includes either (1) an electronic copy of the newspaper or (2) a network address where an electronic copy may be obtained.

Payment for the information includes transfer of digital cash to the vending machine.

The invention is also directed to a method of servicing a vending machine equipped with a transceiver, including the steps of: sending a query to the vending machine, and receiving service information from the vending machine if the person sending the query is an authorized service person. Service personnel have access to options including one or more of loading the vending machine with one or more new information products, collecting electronic cash, selecting maintenance and utility routines, and exiting.

The invention is also directed to a system for requesting and providing information related to a newspaper, including, a vending machine equipped with a transceiver for providing information upon request, and a portable computing unit equipped with a transceiver for requesting information from the vending machine and receiving requested information from the vending machine over the transceiver. The transceivers may be infrared transceivers. The portable computing unit is linked to a network over a wireless link.

Payment for requested information is made by transferring digital cash from the portable computing unit to the vending machine.

The invention is also directed to computer program products for carrying out the invention on both the portable computing device and on the vending machine.

The novel features of this invention solve several problems with the prior art. By allowing the user to respond to visual advertising (the newspaper headlines) in an immediate electronic way that is convenient and satisfying, the retailer has increased the incentive for potential purchasers. In addition, once the user is viewing the document on-line he may find additional information he needs and is willing to pay for, such as previous issues of the newspaper that contain related stories.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description, in which:

FIG. 11 is an exemplary menu used in the USP of FIG. 10.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
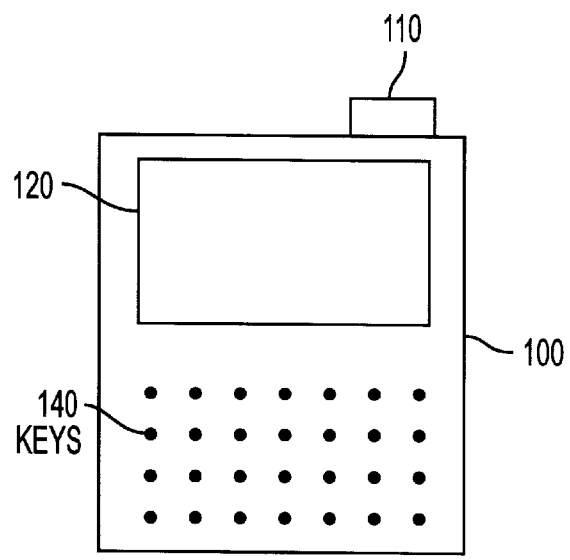
FIG. 1A is a top view of a personal computing device equipped with an infrared transceiver.

FIG. 1A is a top view of a personal computing device 100 having a keyboard 140 and an IRTR 110.

Figure 1B:
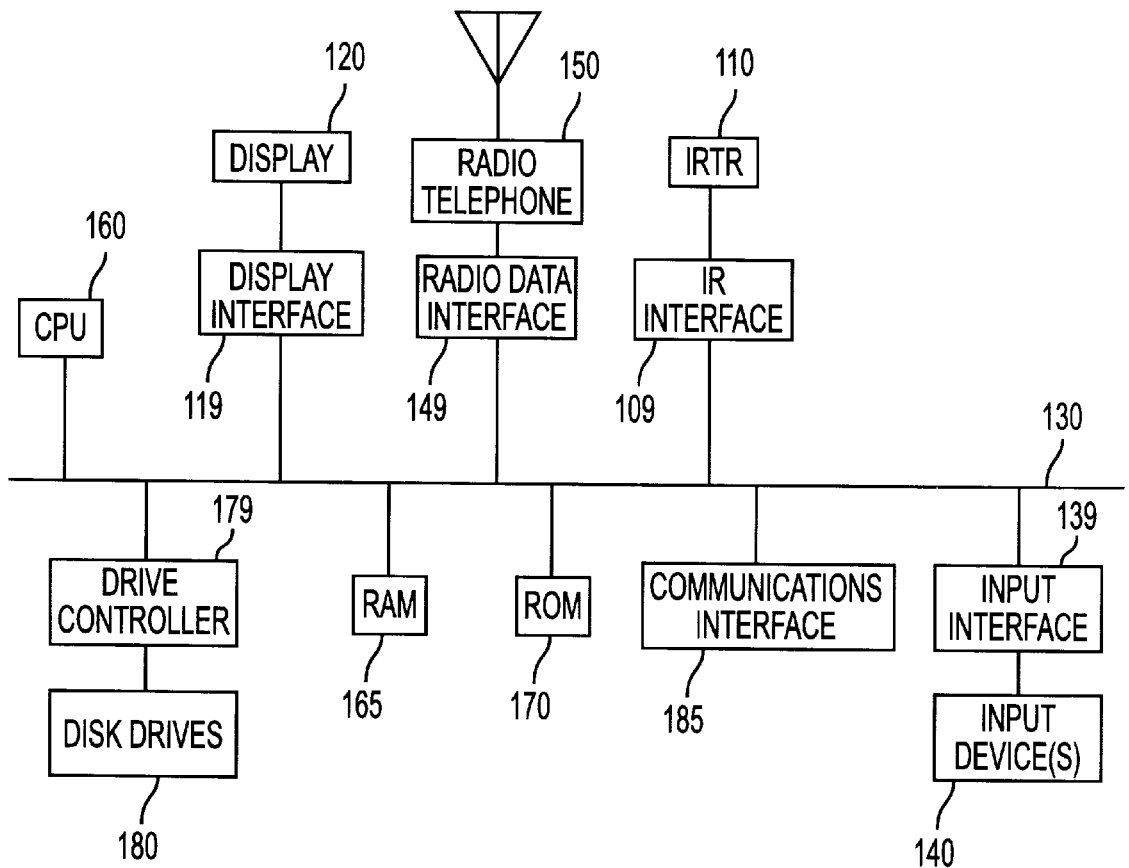
FIG. 1B is a block diagram of a user's personal computing device in accordance with the invention.

FIG. 1B is a block diagram of a user's personal computing device in accordance with the invention. In this exemplary embodiment, the user's computing device (100) depicted here is an electronic reading device, having relatively few user functions beyond those required to page through articles and other material to be read. Other embodiments of the invention would use a more sophisticated personal digital assistant (PDA) or a portable laptop computer for implementing additional functionality.

The basic elements of the electronic reader in this embodiment include a display such as a liquid crystal display (LCD) panel (120), various user control buttons for moving text and images on the display (140), an infra-red transmitter/receiver (IRTR, 110) for communications with the electronic vending machine, and radio telephone transmitter/receiver (150) which may be embodied as an RF modem integrated with a cellular telephone.

In addition, as shown more clearly in FIG. 1B, a CPU 160 associated with memory (ROM 165 and RAM 170) serves to control the display 120, radio telephone 150 infrared transceiver 110 and keyboard 140. A pointing and clicking device is optionally available to provide the user with additional flexibility in manipulated the document on the display. An optional disk drive (180) is provided to facilitate loading of data and software and moving stored documents from the device to other computing devices. Similarly, a communications interface such as a serial port may be provided. The infrared transmitter receiver 110 serves as a communications link to the vending machine for sending and receiving data. This is discussed more in detail hereinafter.

This electronic reader (100) communicates via its IRTR (110) with a similar unit attached to the electronic vending machine (200 shown in FIG. 2). In the embodiment shown, the electronic vending machine is a standard newspaper vending machine with an IRTR 210 attached.

When the IRTR (110) of the electronic reader (100) is aimed at the IRTR of the vending machine and the user presses a button requesting information from it, a data link is established between the two units as discussed more hereinafter. Using this data link, the vending machine sends a data stream to the electronic reader. This data stream will contain either the necessary information to access the electronic version of the newspaper via computer networks, or will contain the complete text of the newspaper or of a desired article.

If the data stream contained network access information, the electronic reader would then initiate a radio telephone call using, for example, a cellular modem to the network service provider via, for example, a cellular repeater and a cellular central office to a wired telephone central office. The result would be a connection to the appropriate network. After the connection to the appropriate network had been made, the user's electronic reader would be able to either download the electronic newspaper or browse it on-line.

FIG. 1B illustrates the overall internal bus structure for an electronic reader. The bus (260) allows the microprocessor (265 and 270) to fetch programming instructions stored in read-only memory (253) for execution and to fetch from and store data into memory. In addition, if the size of the software program to enable network connection or browsing of the document is substantial, the microprocessor can retrieve the instructions to be executed by requesting those instructions from the disk controller (179) which accesses and retrieves the instructions from a disk drive (180) such as a hard disk. The microprocessor also controls the infra-red interface (109) which, in turn, controls the IRTR device (110). Similarly, the microprocessor controls the radio telephone interface (149) which, in turn, controls the radio telephony device (150). The microprocessor also controls the display interface (119), the communications interface (185) and the input interface (139) in a like manner.

Figure 2A:
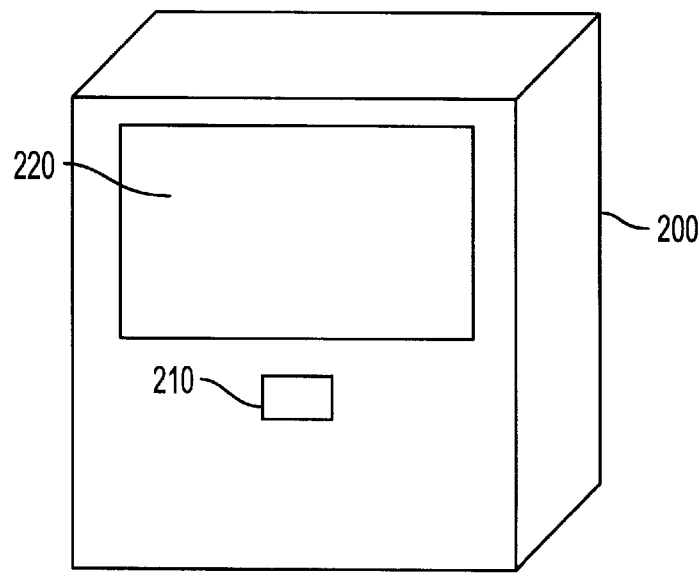
FIG. 2A is a perspective view of a newspaper vending machine equipped with an infrared transceiver.

FIG. 2A is a perspective view of a newspaper vending machine equipped with an infrared transceiver. Structurally, the vending machine 200 is a basic newspaper vending machine as known in the prior art. It, however, has been equipped with computer control and an infrared transmitter receiver 210 as shown in FIG. 2A. Window 220 may either be a transparent window for displaying the headlines on the front of a physical newspaper or may be an electronic display for displaying electronic portions of an electronic newspaper stored in memory within the vending machine 200.

Figure 2B:
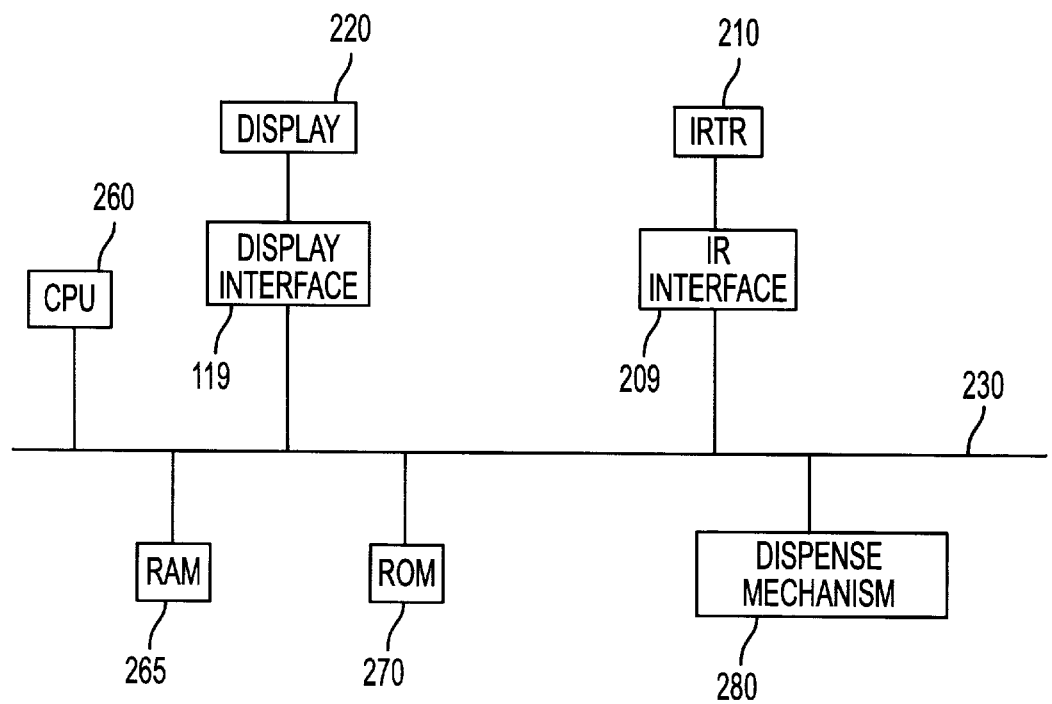
FIG. 2B is a block diagram of a computer control for implementing the vending machine of FIG. 2A.

FIG. 2B is a block diagram of a computer control for implementing the vending machine of FIG. 2A. A CPU 260 controls bus 230 and devices attached thereto. ROM 265 and RAM 270 constitute the memory of the computer. If window 220 is an electronic display, then display interface 119 and display 120 are connected to the bus for receiving display information. IRTR 210 is connected by IR interface 209 to the bus 230. In addition, the processor 260 controls a dispense mechanism 280 to permit a copy of a physical newspaper to be removed from the vending machine upon appropriate payment. The use of the vending machine together with the user device is discussed more hereinafter.

Figure 3:
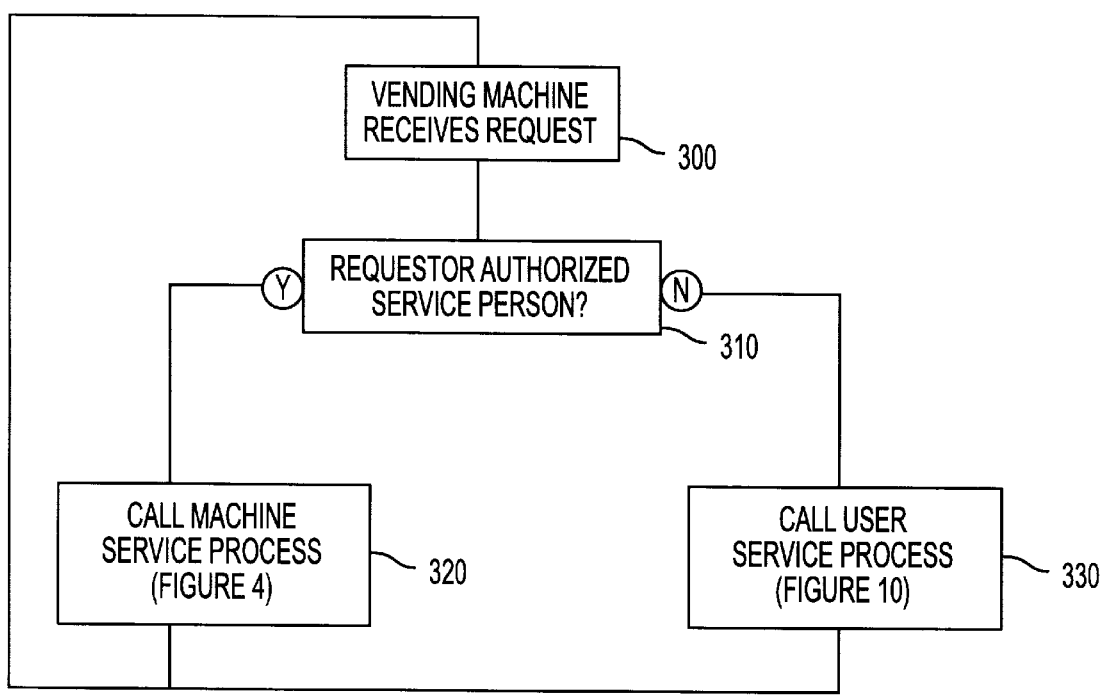
FIG. 3 is a high level flow chart of processes used in accordance with the invention.

FIG. 3 is a high level flow chart of processes used in accordance with the invention. The vending machine of FIGS. 2A and 2B receives a request for information across infrared link provided by IR transceiver 210. That request includes a user identification. The vending machine checks to determine whether the user identification is that of an authorized service person. If it is (310-Y), the machine service process (320) is called. If the requester is not an authorized service person (310-N), the user service process (330) is called. The machine service process (MSP) is discussed more in conjunction with FIG. 4 and the user service process (330) is discussed more in conjunction with FIG. 10.

Figure 4:
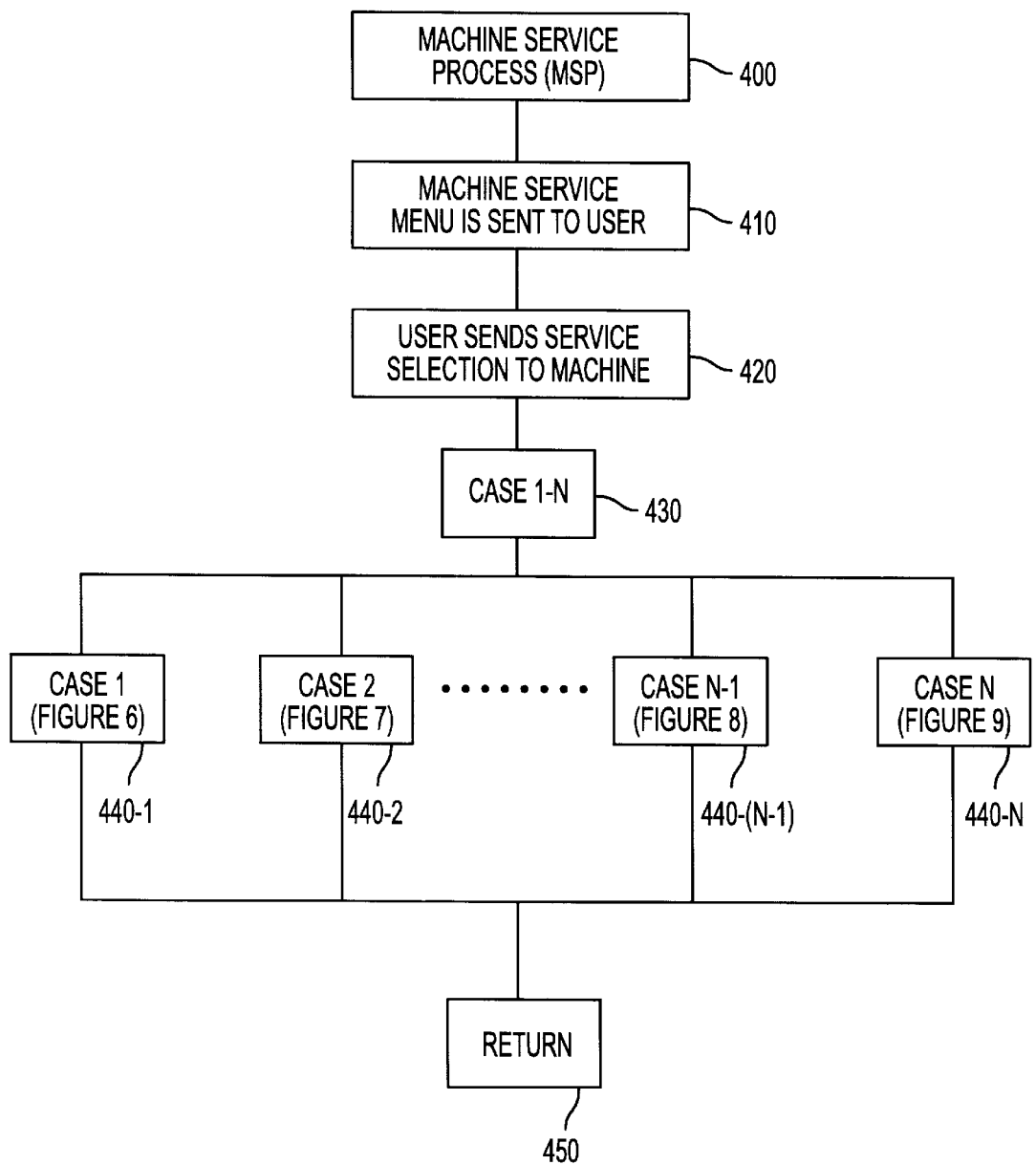
FIG. 4 is a flow chart of a machine service process (MSP) shown in FIG. 3.
Figure 5:
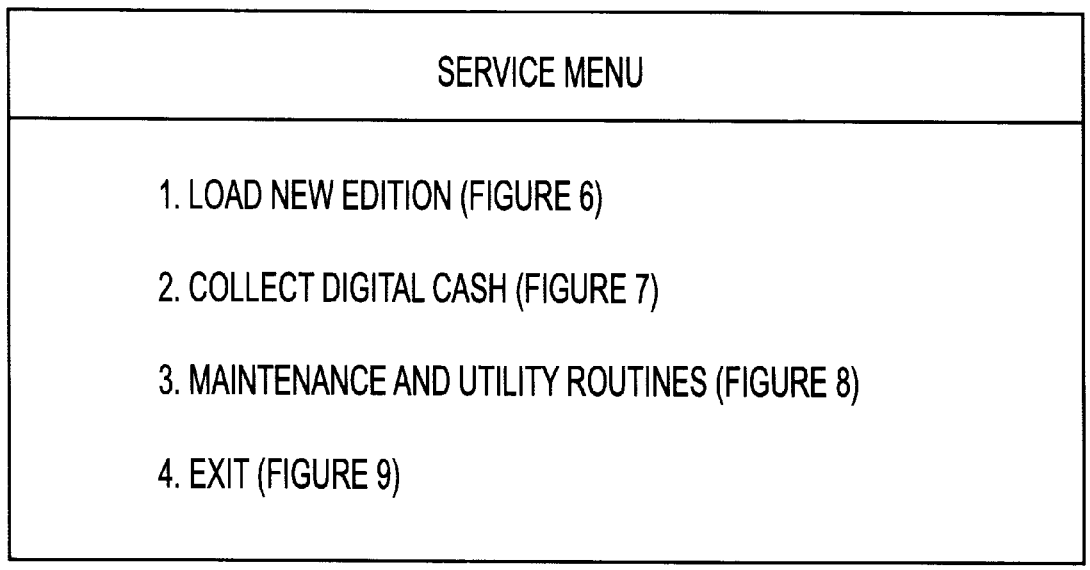
FIG. 5 is an exemplary service menu used in the process of FIG. 4.

FIG. 4 is a flow chart of the machine service process (MSP) shown in FIG. 3. When the user requesting information is an authorized service person, a service menu (410) is sent to the user. An exemplary machine service menu is shown in FIG. 5 and will be discussed hereinafter. The user sends a service selection (420) to the machine and appropriate processing is performed in the case of each individual selection (430). The individual case arms (440-1—440-N)

are discussed in conjunction with FIGS. 6–9. When individual case arm processing is completed, the process returns, looping back to the top of item 300 shown in FIG. 3.

FIG. 5 is an exemplary service menu used in the process of FIG. 4. The menu contains a number of options, each related to typical items of service which might be associated with the vending machine. These functions include, loading a new edition of the paper in both paper and electronic forms, collecting digital cash, invoking maintenance and utility routines and for exiting to the main routine shown in FIG. 3. These are individually discussed in detail in conjunction with FIGS. 6–9.

Figure 6:
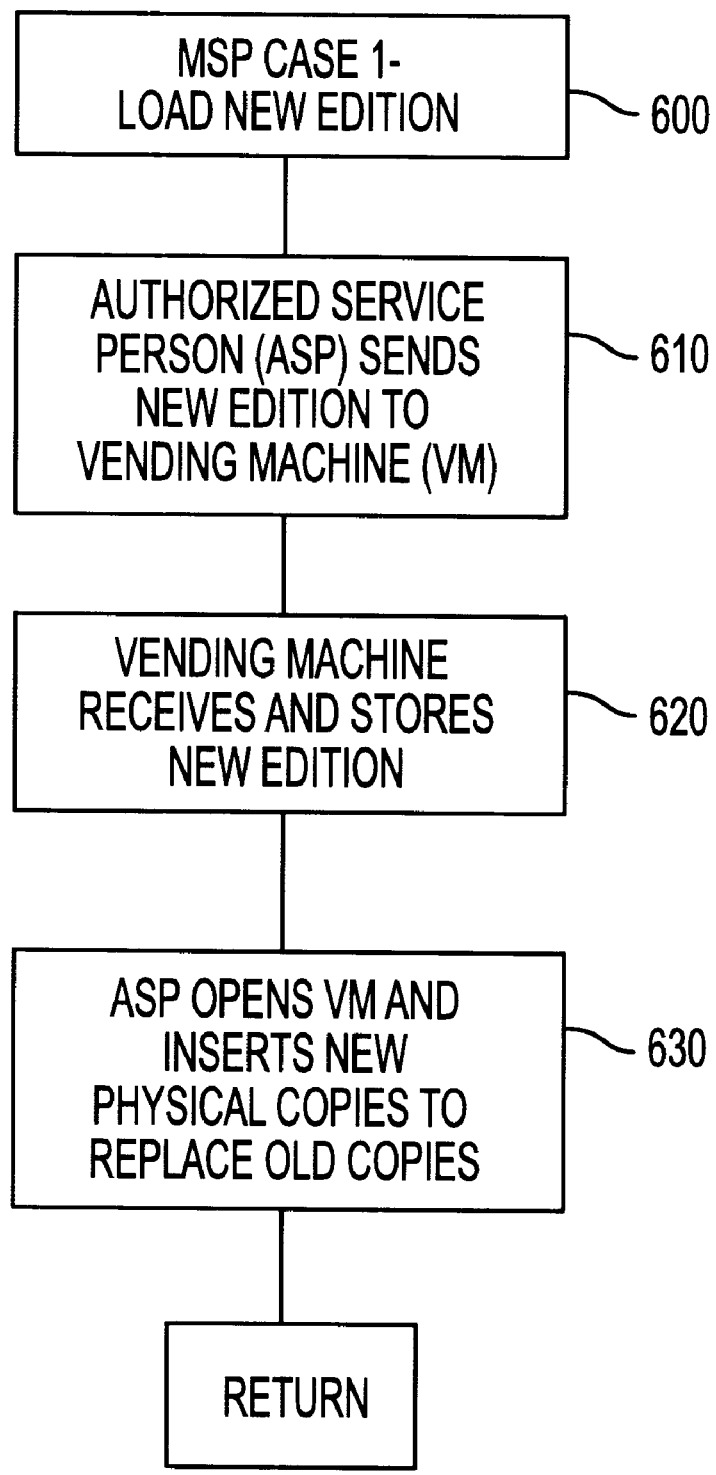
FIG. 6 is an exemplary protocol explaining the interaction between a user device and the vending machine when loading a new edition of the newspaper (MSP case 1).

FIG. 6 is an exemplary protocol explaining the interaction between a user device and the vending machine when loading a new edition of the newspaper (MSP—case 1). By selecting this menu selection, an authorized service person sends a new edition of the electronic form of the newspaper to the vending machine (610). The vending machine receives and stores the electronic edition (620) and then the authorized service person can open the vending machine and insert new physical copies of the newspaper in the machine to replace the previous edition (630). The process then returns (640).

Figure 7:
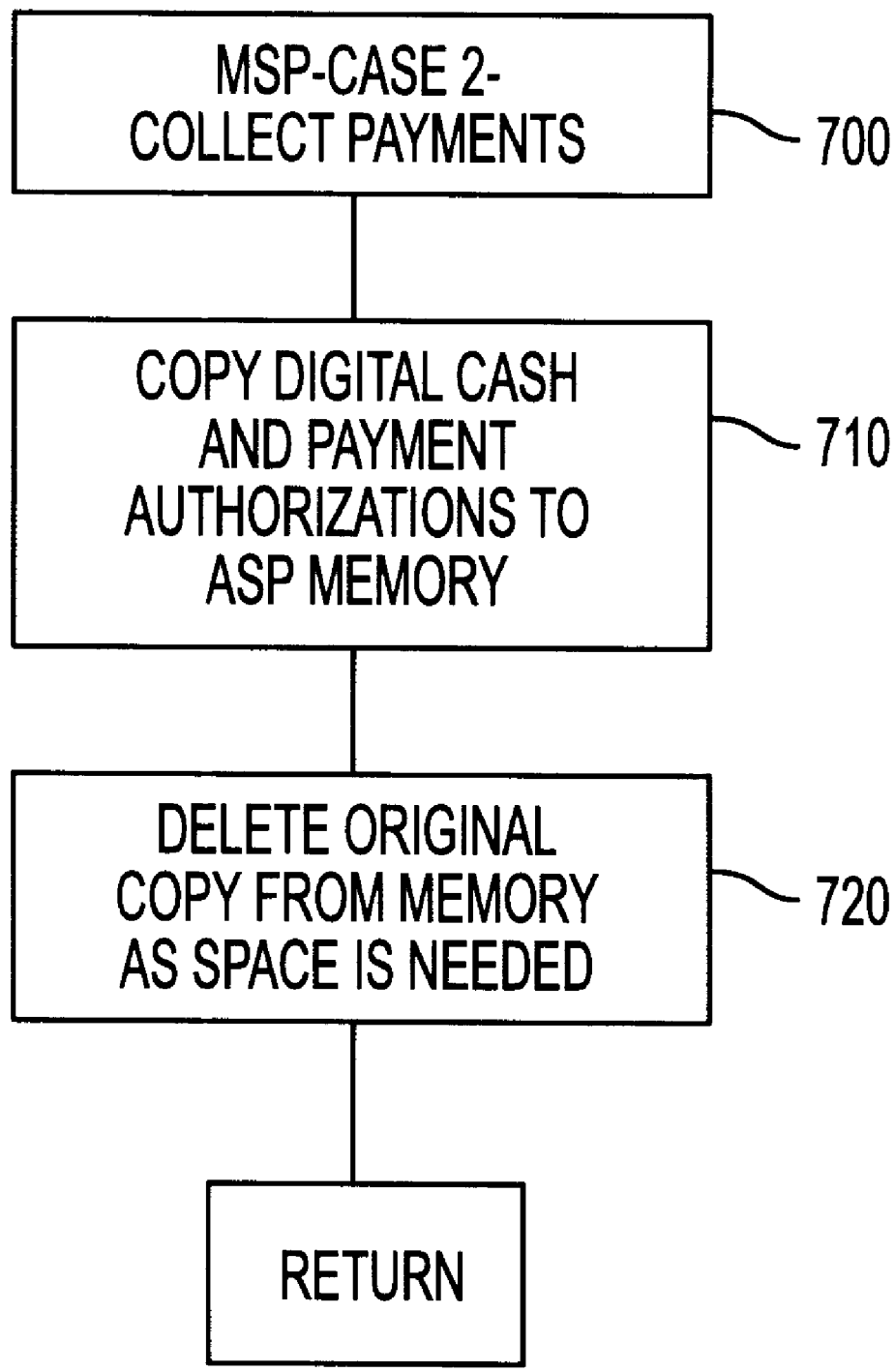
FIG. 7 is an exemplary protocol explaining the interaction between a user device and the vending machine when collecting payments (MSP case 2).

FIG. 7 is an exemplary protocol explaining the interaction between a user device and the vending machine when collecting payments (MSP—case 2). Digital cash, received in payment of newspaper and article purchases, and payment authorizations, received in such payment, are stored in, preferably, nonvolatile memory (710) such as EEPROM.

Public key encryption enables one to create the electronic equivalent of money. A customer can go to the bank with a smart token, and, instead of filling out a withdrawal slip and exchanging it for three one hundred dollar bills, the customer can create an electronic withdrawal form which he fills out and signs with his secret key. The withdrawal form is transferred to the bank's computer where the bank verifies it using the token holder's public key. If, instead of returning one hundred dollar bills to the token holder, the bank were to take an electronic form by which it promised to pay to the bearer one hundred dollars and then sign that electronic token using the bank's private key, customers and merchants could verify the signed money orders using the bank's widely published public key.

A one hundred dollar bill is not much different from the signed money order referred to in the preceding paragraph. A hundred dollar bill contains indicia of authenticity in the form of a counterfeit resistant design and authorized signatures. If, instead of a bank, the U.S. Treasury were to issue electronic certificates signed by the U.S. Treasury's private key, these electronic certificates could be transferred from user to user just like one hundred dollar bills.

There are two types of digital cash. One is called identified digital cash and the other is anonymous digital cash. Identified digital cash contains information revealing the identity of the person who originally withdrew the money from the bank. Identified digital cash has a disadvantage that, like credit cards, it enables the bank to track the money as it moves through the economy.

Anonymous digital cash works just like paper cash. Once anonymous digital cash is withdrawn from the bank, it can be spent without leaving a transaction trail. Anonymous digital cash is created by using numbered bank accounts (that is, a bank account with only a number for identification and not the name and address of the owner) and blind signatures. Blind signatures are discussed in the August, 1992 edition of *Scientific American* at pages 96–101.

There are two other ways of categorizing digital cash. On line digital cash requires one to interact with the bank via modem or network to conduct a transaction with a third party. Off line digital cash can be transferred to a third party without directly involving a bank.

Off line, anonymous digital cash is the most complex form of digital cash because of the double spending problem. The double spending problem occurs because electronic monetary certificates can be copied very easily. Therefore, if one has a one hundred dollar certificate signed by a bank, it could be reproduced one hundred times and spent one hundred times. On-line digital cash systems prevent double spending by requiring merchants to contact a bank's computer with every sale. The bank maintains a data base of all the spent pieces of digital cash and can easily indicate to the merchants if a given piece of digital cash is still spendable. If the cash has already been spent, the merchant refuses the sale in a way similar to the way credit cards are currently verified.

There are at least two ways of overcoming the double spending problem with respect to electronic money. One way is to embed a special tamper proof chip into a smart card which would detect the attempt and would not permit the transaction.

The other way involves arranging the cryptographic protocols so that if a piece of cash is double spent, the act of double spending provides enough information that the double spender can be identified. Digital cash systems can accumulate the complete path that the digital cash has made through the economy. That is, the particulars of each transaction are appended to the piece of digital cash and travel with it as it moves from person to person. When the cash is finally deposited, the bank will check its data base to see if the piece of digital cash was double spent.

With off-line anonymous digital cash, if the digital cash was double spent, the information accumulated along the way, now accessible by virtue of the double spending, will identify the double spender. In this way, the identity of the spender is revealed only if the cash is double spent. If the cash is not double spent, the bank cannot determine the identity of the original spender nor can it reconstruct the path the cash took through the economy.

It is clear that some of the essential properties of electronic money tokens are:

1. monetary value,
2. exchangeability,
3. retrievability, and
4. tamper resistance.

Other desirable properties of electronic monetary tokens are divisibility, traceability, and the ability to make cash purchases in a convenient and easy manner.

Another characteristic of electronic money is that a variety of restrictions and limitations on use can be imposed. For example, if money were earmarked for educational expenses, the identifications of institutions where such money might be spent could be imposed as a restriction on the spendability of the electronic money. Therefore, a student at Anywhere University could spend the money at the bookstore at the university or at the university dining halls, but not at pool halls.

Most versions of electronic cash permit a copy to be as valid as an original electronic version since protections are employed to ensure that it may not be spent twice. As the memory in the vending machine fills up with digital cash, it is desirable to periodically delete the original copy from memory as space is needed for additional copies of electronic money. As a matter of policy, one may wish to follow the common policy of physically removing all remnants of digital money like one physically removes actual money during the gathering or collection of the payments from the various vending machines. The process returns at 730.

Figure 8:
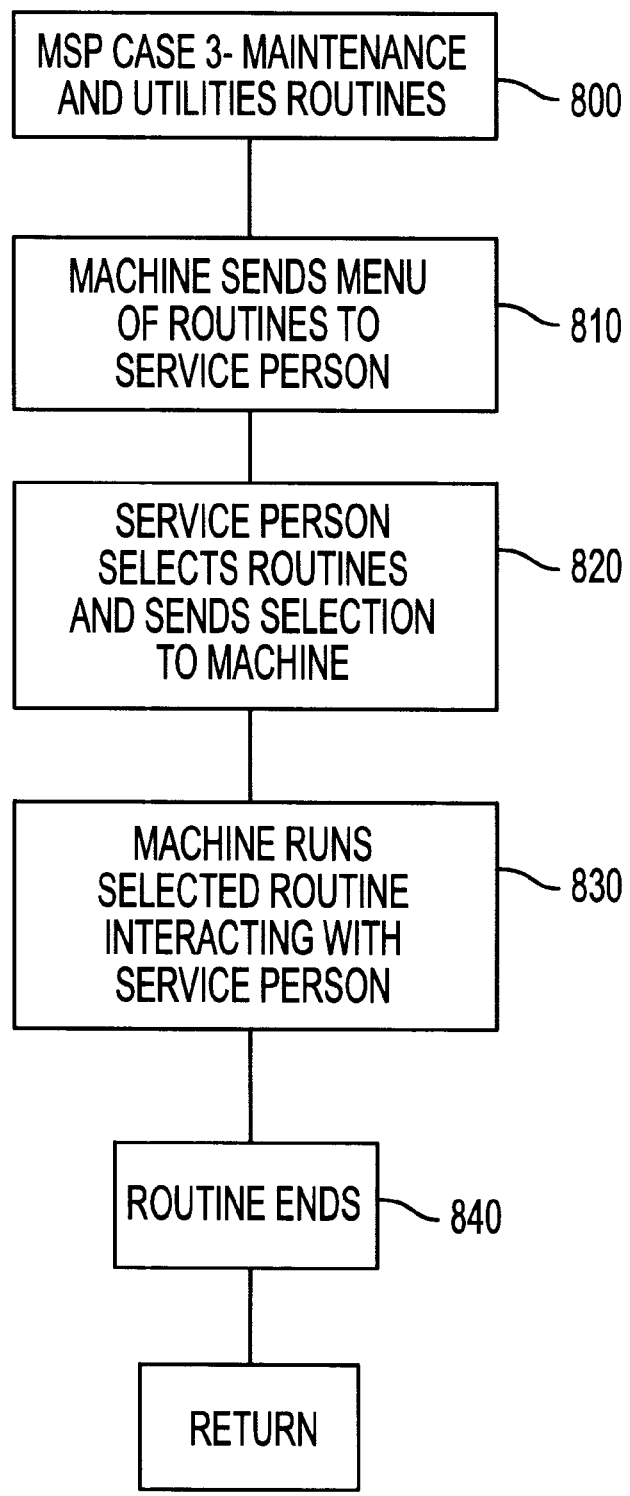
FIG. 8 is an exemplary protocol explaining the interaction between a user device and the vending machine when using maintenance and utility routines (MSP case 3).

FIG. 8 is an exemplary protocol explaining the interaction between a user device and the vending machine when a service person desires to invoke maintenance and utility routines (MSP—case 3). When this option is selected (800), the machine sends a menu of routines to the service person (810) for selection. The service person selects the particular routine of interest and sends that selection to the machine (820) where the machine loads and runs the routine under control of the service person. When the service person is done with the routine, the routine ends (840) and the process returns (850).

The type of maintenance and service and utility routines that are available vary with a particular implementation and processor. Typically, these could be as extensive as a set of maintenance and utility routines associated with a network server. On the other hand, these could be a very minimal subset of routines for performing some basic functionality such as testing memory utilization or test routines for the processor.

Figure 9:
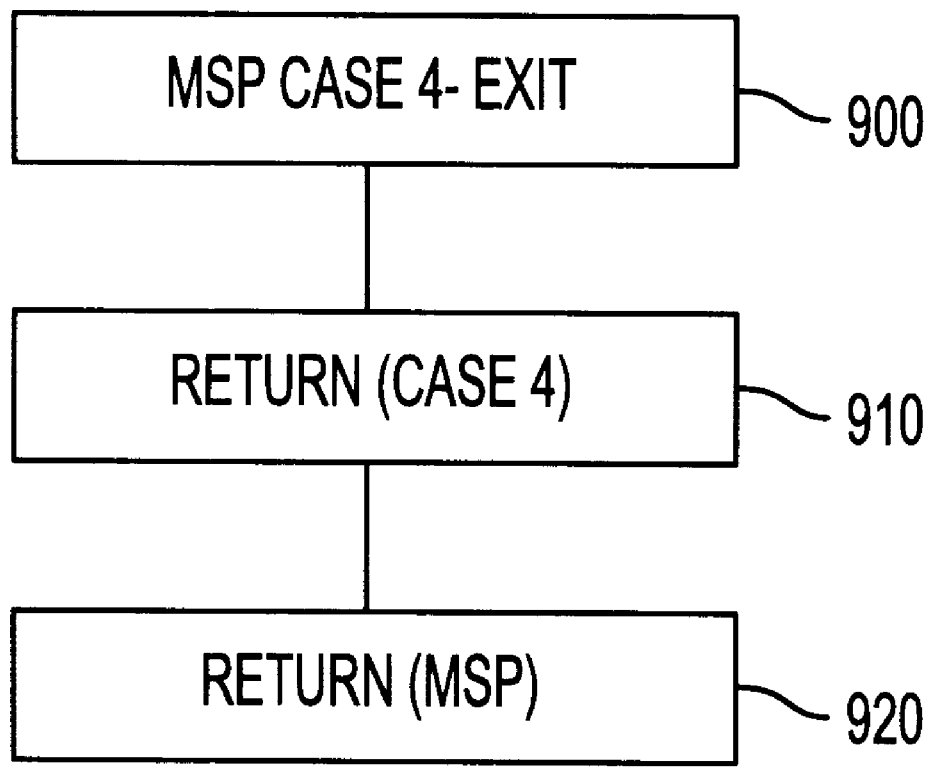
FIG. 9 is an exemplary protocol explaining the interaction between a user device and the vending machine when exiting the MSP routine (MSP case 4).

FIG. 9 is an exemplary protocol explaining the interaction between a user device and the vending machine upon exiting the MSP routine (MSP—case 4). When the service person has completed his maintenance and servicing of the vending machine, he will exit (900). In that case, case 4 returns (910) and the maintenance service process returns to the main routine shown in FIG. 3.

Figure 10:
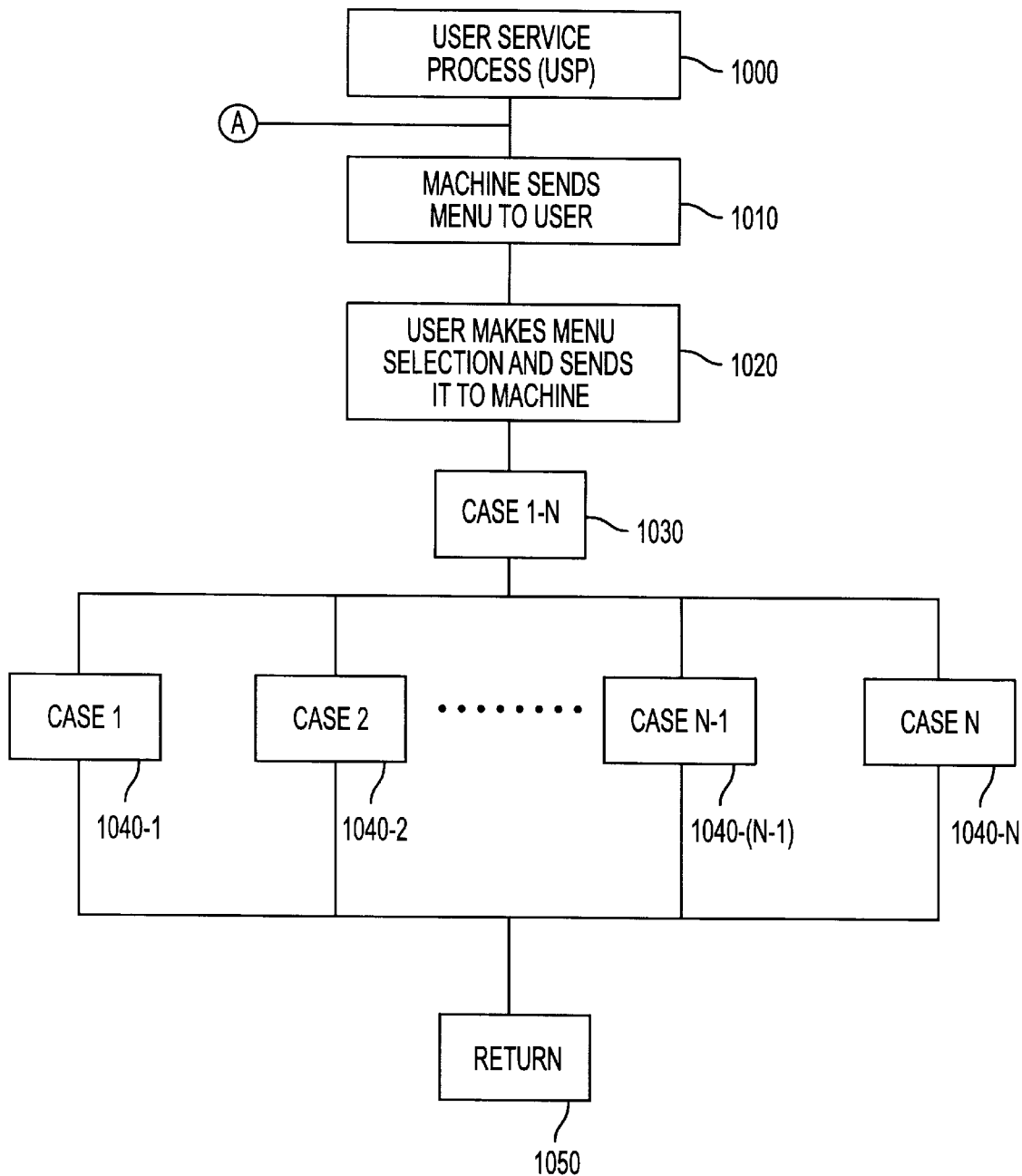
FIG. 10 is a flow chart of a user service process (USP) shown in FIG. 3.

FIG. 10 is a flow chart of a user service process (USP) shown in FIG. 3. FIGS. 10 and 11 parallel in function FIGS. 4 and 5 above. However, FIGS. 10 and 11 are related to the user service process (330) shown in FIG. 3 whereas FIGS. 4 and 5 related to machine service process 320 shown in FIG. 3. When the user requesting information from the vending machine is not an authorized service person, the machine sends a menu to the user (1010) from which the user makes menu selection (1020) and sends it to the machine. An example of that menu is shown in FIG. 11. Based on the user's menu selection, a particular case arm of cases 1-N (1030) is selected and processed. The individual case arms are shown at 1040-1—1040-N. The menu shown in FIG. 11 contains five selections. In this exemplary menu, a user may purchase an entire electronic article from the vending machine. The user could also purchase an entire electronic newspaper from the vending machine. This can be done in two fashions: either by direct download, or by receiving the URL (Uniform Resource Locator or network address) at which the newspaper is located together with a password permitting access to that location.

Another option permits a user to purchase a physical copy of the newspaper from the vending machine in the usual manner. In another option, a subscriber to the newspaper may obtain either articles or copies from the vending machine without additional cost. A final option permits the user to exit.

Figure 12:
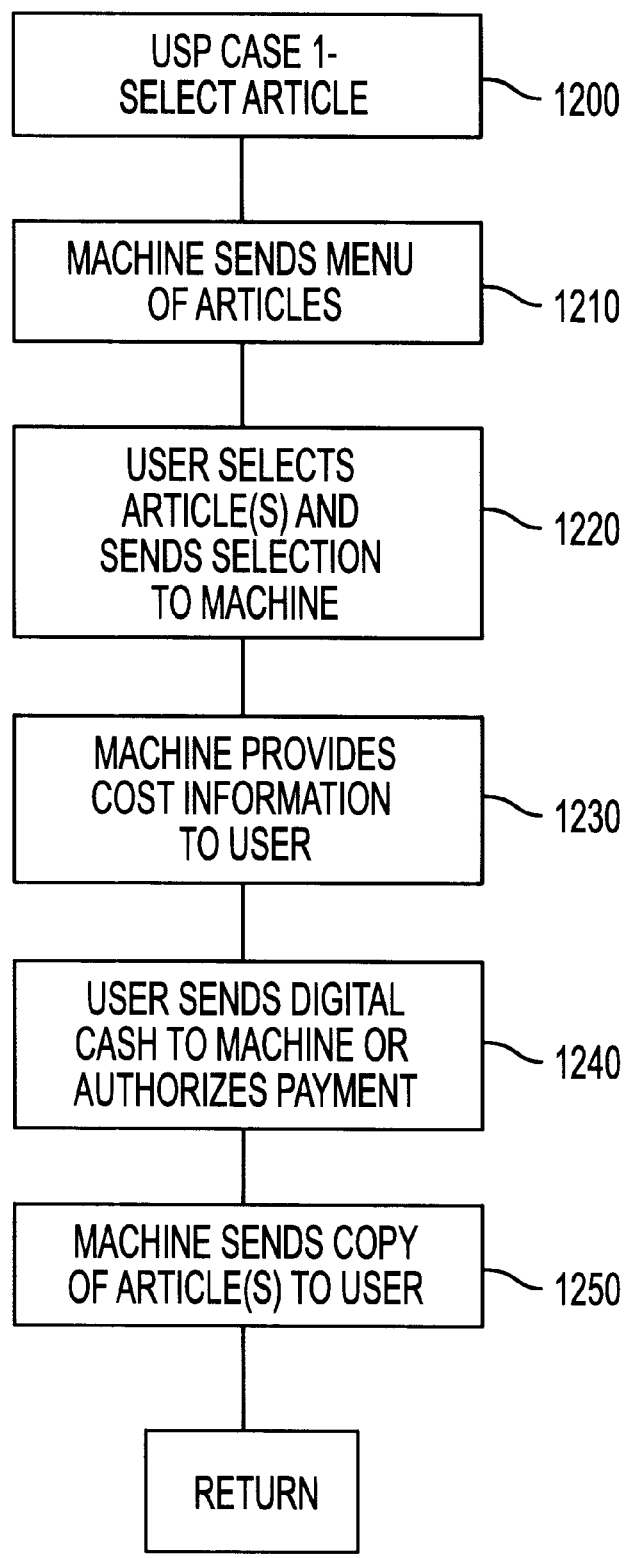
FIG. 12 is an exemplary protocol explaining the interaction between a user device and the vending machine when a user downloads an article (USP case 1).

FIG. 12 is an exemplary protocol explaining the interaction between a user device and the vending machine when a user downloads an article from the machine (USP—case 1). When the user selects this option (1200), the vending machine sends a menu of articles to the user (1210). The user selects a desired article or articles and sends the selection to the machine (1220). The machine provides cost information to the user of the items selected (1230) and, if the user desires to complete the transaction, the user sends digital cash to the machine or otherwise authorizes payment (1240). When payment has been received, the machine sends a copy of the articles to the user (1250) and the process returns.

Figure 13:
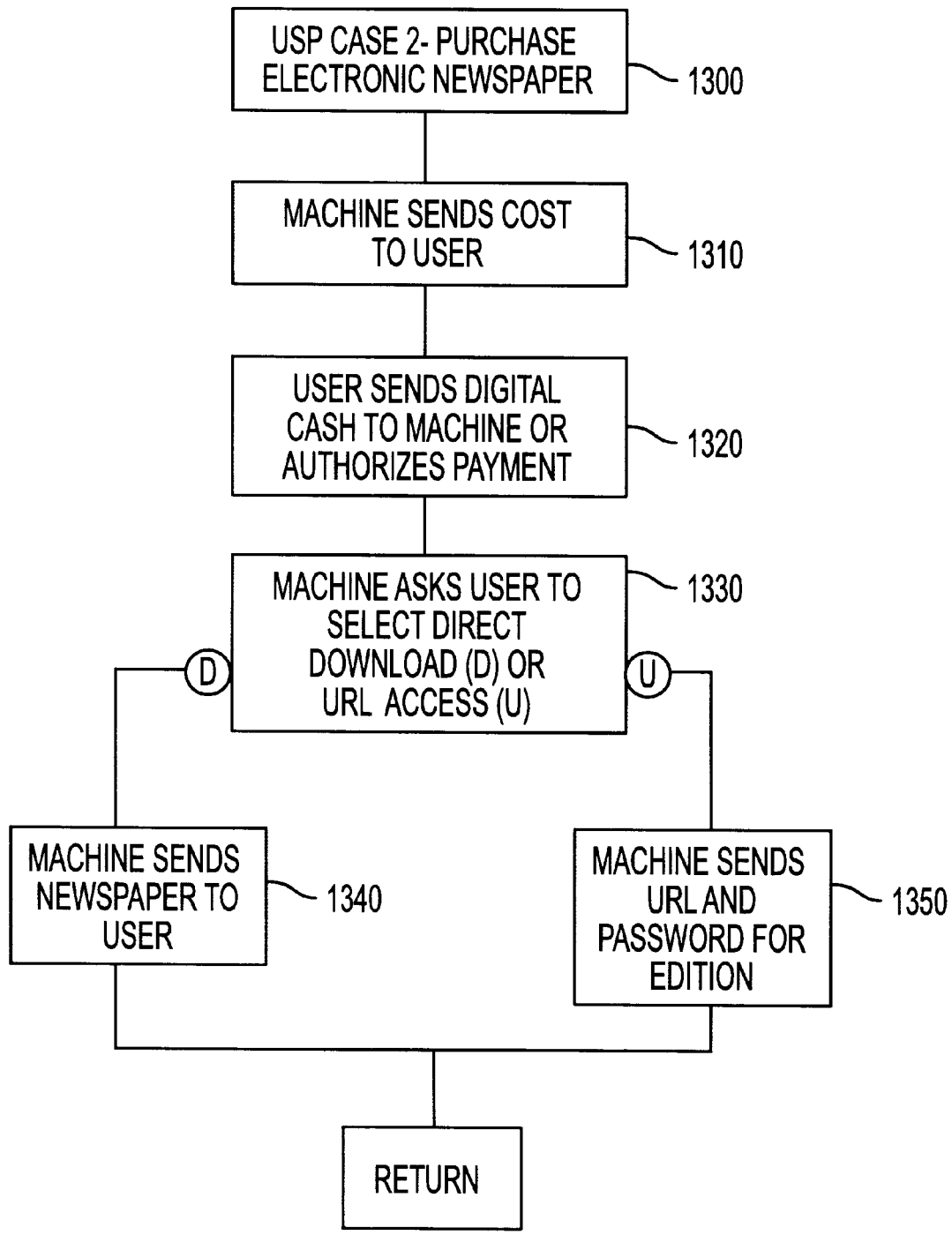
FIG. 13 is an exemplary protocol explaining the interaction between a user device and the vending machine when a user purchases an electronic version of a newspaper (USP case 2).

FIG. 13 is an exemplary protocol explaining the interaction between a user device and the vending machine when a user purchases an electronic newspaper. When a user selects this option (1300), the machine sends cost information to the user (1310) and the user sends digital cash to the machine or otherwise authorizes payment (1320). The machine asks the user to select a download methodology including direct download (D) or URL access (U) (1330). If the user selects direct download, the machine sends the electronic version of the newspaper over the infrared transceiver link to the user (1340). If the user selects URL access, the machine sends the URL and a password for the particular edition purchased to the user for use in access over a network, such as the Internet (1350) and the process returns.

Figure 14:
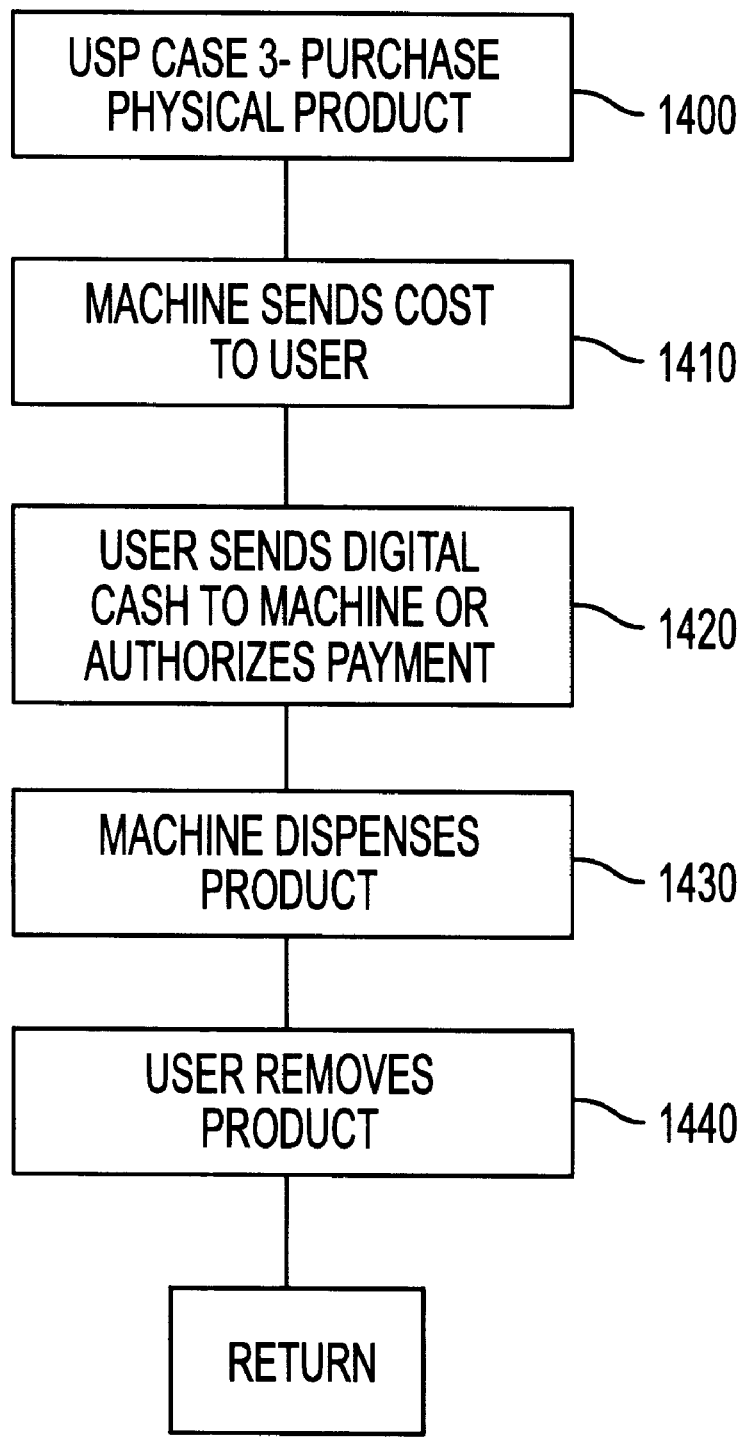
FIG. 14 is an exemplary protocol explaining the interaction between a user device and the vending machine when a user purchases a physical product from a vending machine (USP case 3).

FIG. 14 is an exemplary protocol explaining the interaction between a user device and the vending machine when a user purchases a physical product from the vending machine. When the user selects this option (1400), the vending machine sends cost information to the user (1410) relating to the purchase. The user either sends digital cash to the machine or authorizes payment in other ways (1420). When payment has been received, the machine dispenses the product (1430), the user removes the product (1440) and the process returns.

Figure 15:
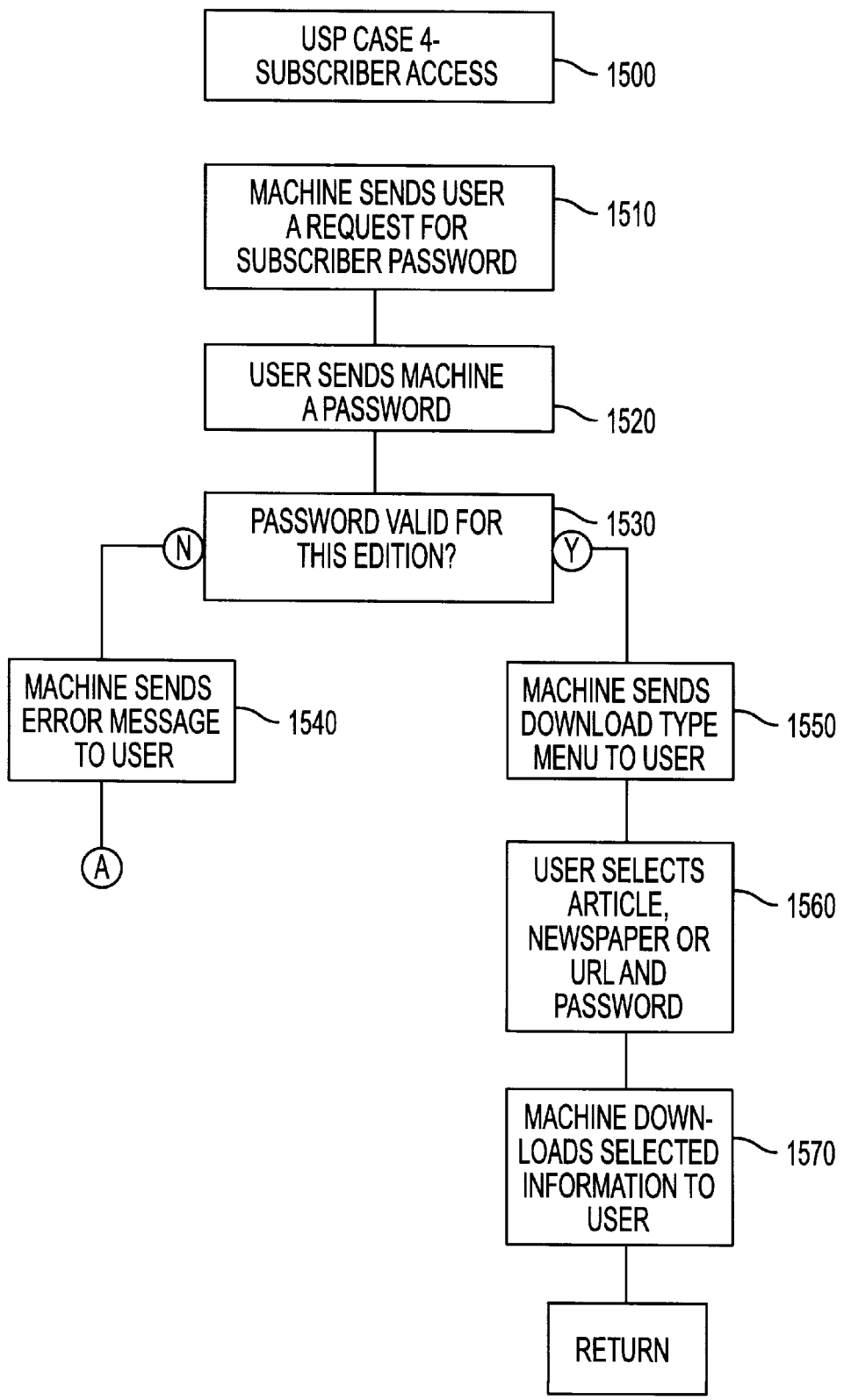
FIG. 15 is an exemplary protocol explaining the interaction between a user device and the vending machine when a prepaid subscriber accesses electronic products from a vending machine (USP case 4).

FIG. 15 is an exemplary protocol explaining the interaction between a user device and the vending machine when a prepaid subscriber accesses electronic products from a vending machine (USP—case 4). When a user selects this option (1500) and is a paid up subscriber, the machine sends the user a request for a subscriber password (1510). The user sends to the machine a password which he obtained as part of the subscription process. The vending machine checks to see if the password is valid for this particular edition (1530) and if it is not (1530-N), the machine sends the user an error message (1540) and the process jumps to before step 1010 and the process shown in FIG. 10 is indicated by continuation bubble A.

If the password is valid for this edition (1530-Y), the machine sends a download type of menu to the user (1550) from which the user may select download of an article, download of a newspaper or URL download together with a password (1560). The user makes a selection and the machine downloads the selected information to the user (1570) and the process returns.

Figure 16:
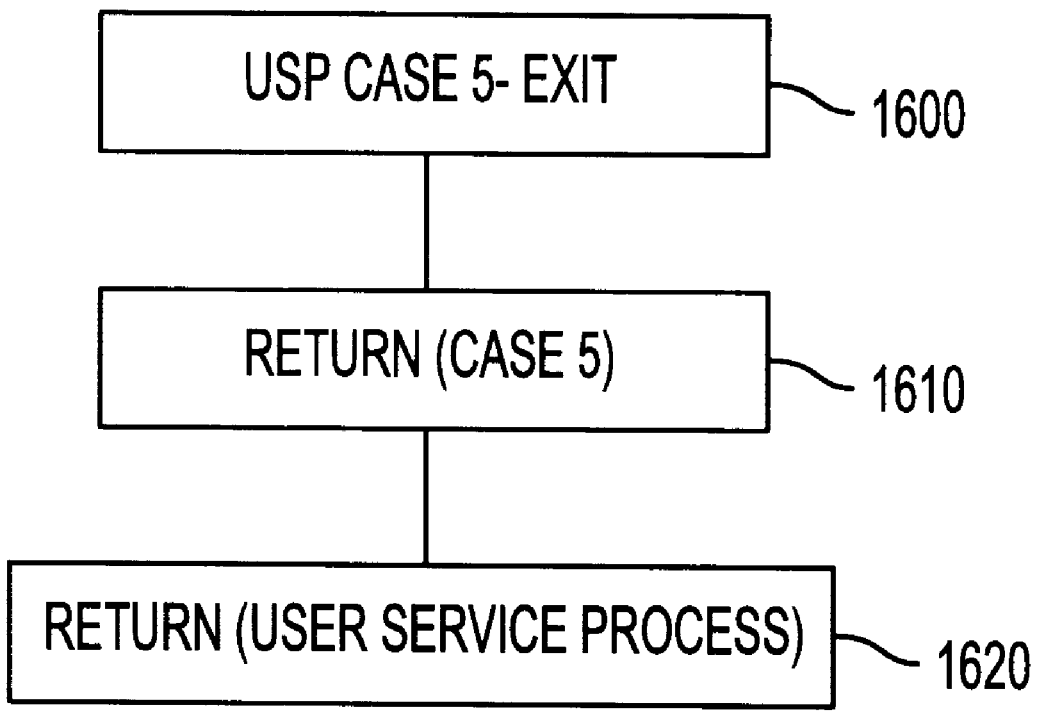
FIG. 16 is an exemplary protocol explaining the interaction between a user device and the vending machine when a user desires to exit from the USP routine.

FIG. 16 is an exemplary protocol explaining the interaction between a user device and a vending machine when a user desires to exit from the USP routine. When a user selects this option, (1600), the case arm 5 returns (1610) and then the user service process returns (1620) passing control to the main routine shown in FIG. 3.

The invention permits a person to obtain an electronic copy of an article or an entire newspaper either directly from a vending machine or over a network without the problems of the prior art.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for dispensing electronic versions of part or all of a newspaper, comprising:

a. a vending machine for dispensing copies of a printed newspaper;

b. a transceiver; and c. a computer, connected to said vending machine and said transceiver, configured to respond to a query from a user received over said transceiver, for providing information related to said newspaper over said transceiver to said user.

2. The apparatus of claim 1 in which said transceiver is an infrared transceiver.

3. The apparatus of claim 1 in which said computer is further configured to dispense a copy of a printed newspaper when payment is received over said transceiver.

4. The apparatus of claim 1 in which the information related to said newspaper is one or more of an article from the newspaper, a network address or a digital copy of said newspaper.

5. Apparatus for receiving information relating to a newspaper from a vending machine equipped with a transceiver, comprising:

a. a transceiver; and b. a computer, connected to said transceiver, configured to send a query to said vending machine over said transceiver and to receive information related to said newspaper over said transceiver from said vending machine.

6. The apparatus of claim 5 in which said transceiver is an infrared transceiver.

7. The apparatus of claim 5 including the functionality of a personal digital assistant.

8. A method of retrieving information from an information vending machine equipped with a transceiver, comprising the steps of:

a. providing an element for performing the step of sending a query to said transceiver; and b. providing an element for performing the step of receiving requested information from said vending machine via said transceiver.

9. The method of claim 8 in which said query includes a password.

10. The method of claim 8 in which said query includes subscription information and a password valid for one or more editions of the newspaper.

11. The method of claim 8 in which information received from said vending machine includes at least one of (1) an electronic copy of the newspaper or (2) a network address where an electronic copy may be obtained.

12. The method of claim 8 in which said information includes options including at least one of (1) purchasing an electronic article, (2) purchasing an entire electronic newspaper, (3) purchasing a printed copy of said newspaper (4) subscriber access and (5) exiting the system.

13. The method of claim 8 in which payment for said information includes transfer of digital cash to said vending machine.

14. A method of servicing a vending machine equipped with a wireless short range transceiver, comprising the steps of:

a. providing an element for performing the step of sending a query to said vending machine over said transceiver; and b. providing an element for performing the step of receiving service information from said vending machine over said transceiver if the person sending said query is an authorized service person.

15. The method of claim 14 in which said service information includes service options including one of loading the vending machine with one or more new information products, collecting electronic cash, selecting maintenance and utility routines, and exiting.

16. A system for requesting and providing information related to a newspaper, comprising;

a. a vending machine equipped with a transceiver for providing information upon request, and b. a portable computing unit equipped with a transceiver for requesting information from said vending machine and receiving requested information from said vending machine over said transceiver.

17. The system of claim 16 in which the transceivers of said vending machine and said portable computing unit are infrared transceivers.

18. The system of claim 16 in which said portable computing unit is linked to a network over a wireless link.

19. The system of claim 16 in which payment for requested information is made by transferring digital cash from said portable computing unit to said vending machine.

20. A computer program product for retrieving information from an information vending machine, comprising:

a. a memory medium; and b. a computer program stored on said memory medium, said computer program containing instructions for (a) sending a query to said information vending machine; and (b) receiving said information from said vending machine over a wireless link.

21. A computer program product for sending information to a portable computing device, comprising:

a. a memory medium; and b. a computer program stored on said memory medium, said computer program containing instructions for (a) receiving a query from said portable computing device; and (b) dispensing said information to said portable computer device over a wireless link in response to a payment received over said wireless link.

* * * * *